(12) United States Patent
Rye

(10) Patent No.: US 9,485,975 B1
(45) Date of Patent: Nov. 8, 2016

(54) LURE WITH CYCLICALLY REVERSING BLADE ROTATION

(71) Applicant: Ryan Patrick Rye, Lawrenceville, GA (US)

(72) Inventor: Ryan Rye, Lawrenceville, GA (US)

( * ) Notice: Subject to any disclaimer, the term of this patent is extended or adjusted under 35 U.S.C. 154(b) by 494 days.

(21) Appl. No.: 14/145,985

(22) Filed: Jan. 1, 2014

Related U.S. Application Data

(63) Continuation-in-part of application No. 14/027,229, filed on Sep. 15, 2013, now Pat. No. 9,072,285.

(51) Int. Cl.
*A01K 85/10* (2006.01)
*A01K 85/12* (2006.01)
*A01K 85/01* (2006.01)

(52) U.S. Cl.
CPC ............... *A01K 85/12* (2013.01); *A01K 85/01* (2013.01)

(58) Field of Classification Search
CPC ....... A01K 85/00; A01K 85/10; A01K 85/12
USPC ....... 43/42.02, 42.11, 42.13, 42.19, 42.5, 42, 43/42.03
See application file for complete search history.

(56) References Cited

U.S. PATENT DOCUMENTS

| | | | | |
|---|---|---|---|---|
| 2,764,835 A * | 10/1956 | Schaller | ................. | A01K 85/12 43/42.2 |
| 3,192,660 A * | 7/1965 | Guess | ................... | A01K 85/10 43/42.16 |
| 4,209,932 A * | 7/1980 | Pate | ..................... | A01K 85/00 43/42.11 |
| 4,619,068 A * | 10/1986 | Wotawa | ................ | A01K 85/00 43/42.11 |
| 4,640,041 A * | 2/1987 | Stanley | ................. | A01K 85/00 43/42.13 |
| 6,122,854 A * | 9/2000 | Kinnear | ................ | A01K 85/16 43/42.02 |
| 6,631,581 B2 * | 10/2003 | Gomes | ................... | A01K 85/16 43/26.2 |
| 7,627,978 B2 * | 12/2009 | Davis | ..................... | A01K 85/02 43/42.03 |
| 2008/0202015 A1 * | 8/2008 | Langer | .................. | A01K 85/00 43/42.06 |
| 2009/0145017 A1 * | 6/2009 | Richey | .................. | A01K 85/08 43/43.14 |
| 2012/0260560 A1 * | 10/2012 | Jones | ..................... | A01K 85/12 43/42.22 |

* cited by examiner

*Primary Examiner* — Christopher Harmon

(57) ABSTRACT

A fishing lure comprises a spinning blade that rhythmically changes its direction of rotation. One or more unique link members enable more than 360 degree of blade rotation yet limit the total amount of blade rotation in either direction. The rotating blade causes the link members to wind up until they momentarily stop the rotation of the blade, at which point a hydrodynamic torque still trying to rotate the blade causes the lure to undergo a slight twist motion. The wound-up link members then begin to unravel due to a remaining hydrodynamic force still incident on the forward-moving lure. This winding-and-unwinding cycle automatically repeats as the lure moves forward. The cyclically rhythmic and alternating blade rotations, along with the corresponding twitching motions, result in a unique swimming motion of the lure that more effectively attracts fish and better mimics the random swimming behavior of real life prey.

20 Claims, 17 Drawing Sheets

LURE WITH CYCLICALLY REVERSING BLADE ROTATION

CROSS-REFERENCE TO RELATED APPLICATIONS

This application is a continuation-in-part of pending U.S. patent application Ser. No. 14/027,229, filed Sep. 15, 2013.

BACKGROUND INFORMATION

This disclosure relates to fishing lures. More specifically, this disclosure relates to a bladed lure wherein a common swivel is replaced by one or more link members that enable more than one rotation revolution of a blade member while simultaneously preventing unlimited rotation of the blade member. As a result, when the lure is pulled forward at a generally constant speed, the automatically cycling torsional potential energy of the rotating link members produces alternating clockwise and counterclockwise rotations of the blade member. The cycling blade member rotation in turn helps create a rhythmic twitching motion of the lure.

The construction of a common "spinnerbait" spinner lure is well known. A weighted member and hook are both coupled to a generally V-shaped wire frame. One or more trailing blades are attached to one end the wire frame through a swivel. The swivel allows for unlimited blade rotation as the lure is retrieved, and the blade spins continuously in one rotational direction until lure motion is stopped. All spinnerbaits with hanging blades use swivels to attach such blades to the wire frame in order to allow the blades to freely spin continuously as the lure moves forward.

Simply attaching a thin trailing object to a lure frame without the use of a swivel has historically resulted in erratic and unpredictable behavior of the trailing object. U.S. Pat. No. 1,787,726 to Heddon, et al., describes a plurality of thin metal minnows non-rotatably linked to a wire frame of the lure. Because no swivels are used, the metal minnows sway and dart randomly as the lure moves through the water. As a result, no cyclical minnow rotation or corresponding twitching of the lure can occur. Such unpredictable movement is overcome by the lure described herein, which contains no swivels yet generates controlled and cyclically-alternating blade rotation coupled with a cyclical twitching motion of the lure.

For the sake of this invention, the term "rotating" is defined as a blade completing at least one complete clockwise spinning revolution or at least one complete counter-clockwise spinning revolution (360 degrees or greater). The terms "oscillating," "darting, "swaying," "fluttering," or an equivalent, define an incomplete revolution of rotation, as these terms are most often used to describe motion in other lures wherein swivels are not used to attach trailing metallic members that are dragged through the water as part of the lure. When describing a constant speed of forward lure motion, the term "constant" is defined as an angler turning a fishing reel at a generally steady rate of rotation in an attempt to cause the fishing line to pull the lure forward with a generally unchanging speed in water. Said differently, an angler is not deliberately twitching, jerking, or pausing the fishing line. "Constant" lure motion can also be defined as a lure that is being trolled behind a boat that is moving at a generally steady or unchanging speed.

Research has shown that fish are more responsive to irregular vibrations versus those that are more continuous in nature. A rotating blade on an existing spinner lure emits an unchanging vibration signature as the lure moves a constant speed. Because the blade of a common spinner lure rotates freely in an unlimited manner, a common spinner lure only can emit steady, continuous sounds under water. A spinner lure that could combine the ease of angler retrieval (lure moving at a steady speed) with cyclical blade rotation and rhythmic lure twitches (periodic vibrations and pulses, and not continuous ones) would possess significant advantages over traditional spinner lures. Such a lure would create both visual and auditory stimuli that closer mimic the random and erratic swimming behavior of real life prey. There exists the need for a new and improved type of spinner lure that can simultaneously exhibit rhythmically alternating blade rotations along with cyclical twitch movements when the lure is retrieved at a constant speed.

SUMMARY OF THE INVENTION

A lure consists of a wire form member, a weighted member, a hook, and at least one link member coupling at least one blade to an eyelet located along the wire form member. The link member is desirably not a swivel and desirably cannot allow continuous and unlimited rotation of the blade. Upon initial lure retrieval, the blade begins spinning by rotating in either direction, but after a predetermined number of revolutions, the blade rotation pauses as the wound up non-swivel link member temporarily binds or locks. The hydrodynamic forces spinning the blade continue to try and turn the blade through the means of a residual "twist torque" acting on the blade from the water. However, since the blade is temporarily locked from further rotation, this twist torque is instead transmitted through the wire form member and to the weighted member. The weighted member starts to swing upward with a sideways twitch motion due to this small twist torque. As the weighted member swings upward, a restoring torque—produced by gravity acting on the weighted member during its upswing—begins to develop and increases as the weighted member swings upward from a bottom 0-degree position towards an outward 90-degree position. If the line-attachment eyelet on the lure is at an optimum predetermined location and if the weighted member mass is of a predetermined value relative to the blade member such that the weighted member does not swing or "twitch" beyond 90 degrees and cause the lure to spiral out of control, then the weighted member will pause as it reaches a position of equilibrium at the peak of its slight upswing. Alternatively, the periodic twitching or cyclical pulse-type motion of the lure can be exhibited by the blade member portion of the lure and not the weighted member portion if the weighted member is substantially heavier than the blade member. In order to cause the momentarily-halted blade member to begin rotating in the opposite direction, a remaining hydrodynamic force—produced from water continually pushing back on the link member as the lure moves forward—then causes the unraveling of the coiled up link member. This slight unraveling of a link member creates just enough freedom to allow the blade to then begin rotating in the opposite rotational direction as the weighted member then also returns to its central neutral position. The cycle then begins to repeat itself as the new rotation direction of the blade starts to slow due to the coiling or binding of the non-swivel link member. As a result, the moving lure behaves with a repeating pattern wherein the blade cyclically changes rotational direction while simultaneously imparting a periodic twitch or jerk motion into the lure.

If the weight of the blade member is sufficiently large, then a blade member itself can provide substantially most of the mass needed to quickly sink the lure to the desired fishing depth, and a separate weighted member is not required. Thus, an alternate embodiment can simply contain a wire form member, a link member, and a heavier blade member. An even simpler embodiment of the invention can combine or merge the shape of a link member into the geometry of a blade member, such that the link member geometry becomes an extension of the blade member in a one-piece blade-and-link member that is coupled to a wire form member.

Objects and advantages of the lure with cyclically reversing blade rotation are as follows:
1. The changing rotational direction of the blade can result in a rhythmic beating sound under water versus the continuous rotation vibration sound of common spinner lures.
2. The changing rotational direction of the blade results in a visual twitch of the lure corresponding to each directional change in blade rotation.
3. The unique swimming behavior of the lure does not require an angler to vary the retrieval speed of the lure.

These and other objects and advantages will become readily apparent upon review of the following specification and drawings.

BRIEF DESCRIPTION OF THE DRAWINGS

FIGS. 6A-6C are diagrammatic perspective views of alternate link member shapes, in accordance with the present invention.

FIGS. 9A-9E are diagrammatic perspective views of a pair of metallic ring-shaped link members, similar to the link members shown in the preferred embodiment of FIG. 8, illustrating how a metallic ring-shaped link member can rotate 360 degrees relative to a wire form member.

Drawings - Reference Numerals

| | | | |
|---|---|---|---|
| 20 | lure | 40 | blade member |
| 60 | first eyelet | 80 | wire form member |
| 100 | swivel | 120 | rotation axis |
| 140 | weighted member | 160 | hook |
| 180 | skirt | 200 | second eyelet |
| 220 | first link member | 240 | second link member |
| 260 | neutral position | 280 | counterclockwise direction |
| 300 | counterclockwise arc displacement | 320 | clockwise direction |
| 340 | clockwise arc displacement | 360 | first aperture |
| 380 | median plane | 400 | rattle element |
| 420 | rattle linking member | 440 | rattle attachment aperture |
| 460 | 90-degree position | 480 | 180-degree position |
| 500 | 270-degree position | 520 | axial shift |
| 540 | 360-degree position | 560 | second aperture |
| 580 | spinner | 600 | spacer member |
| 620 | first baited member | 640 | fishing line |
| 660 | second baited member | 680 | third link member |
| 700 | fourth link member | 720 | second blade member |
| 740 | blade-and-link member | | |

DETAILED DESCRIPTION OF PREFERRED EMBODIMENTS

Figure 1:
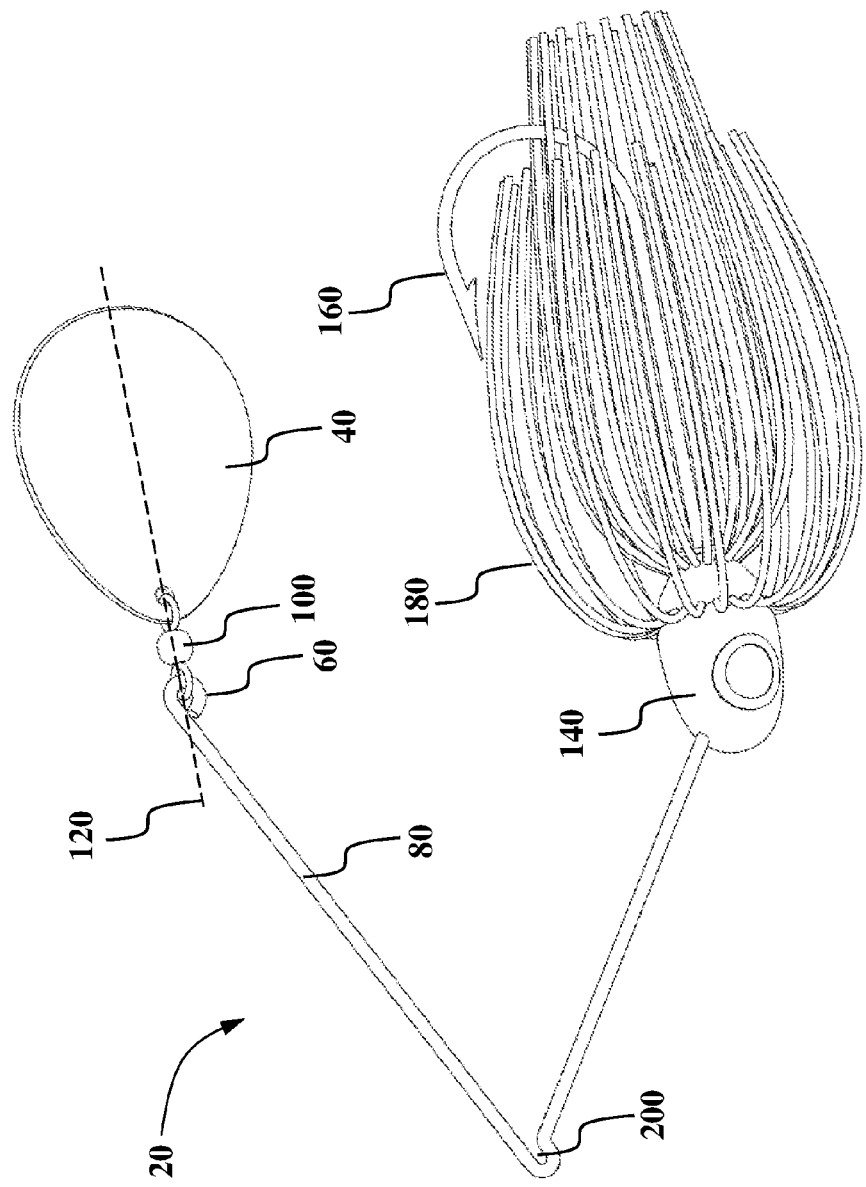
FIG. 1 is a diagrammatic perspective view of prior art.

FIG. 1 illustrates the prior art of a type of fishing lure 20 commonly known as a spinnerbait. A blade member 40 is coupled to a first eyelet 60 of a V-shaped wire form member 80 through a swivel 100, and the swivel 100 allows for unlimited and free rotation of the blade member 40 about a rotation axis 120, with the rotation axis passing through the first eyelet 60 of the wire form member 80. A weighted member 140 and hook 160 are also coupled to the wire form member 80. An elastomeric skirt 180 or other elastomeric "trailer" body member is often attached to help disguise the hook 160. The key element of the spinnerbait is the swivel 100, which enables continuous, unlimited rotation of the blade member 40 while the spinnerbait is being pulled underwater by a line or leader attached to a second eyelet 200 of the V-shaped wire form member 80.

Figure 2:
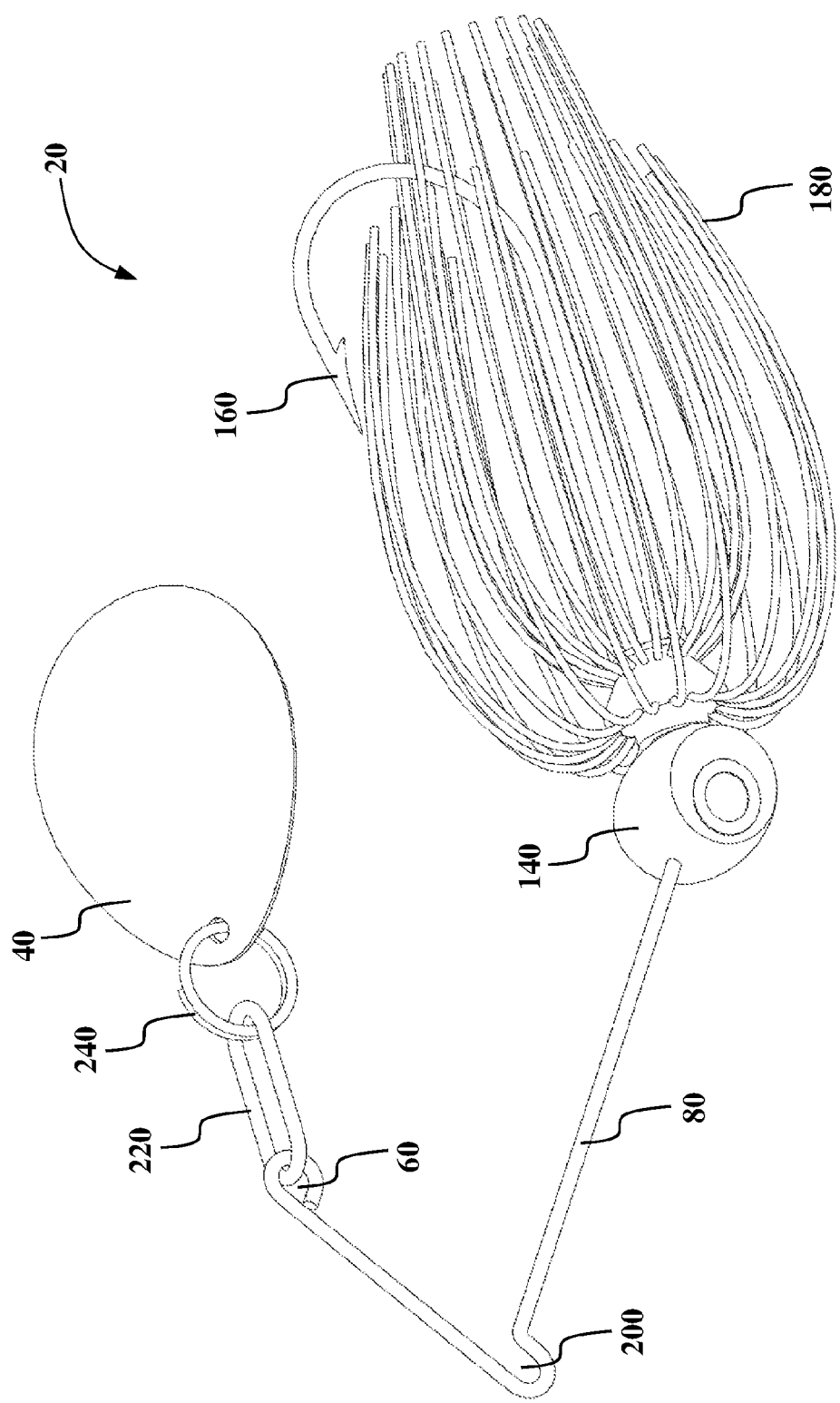
FIG. 2 is a diagrammatic perspective view of a first preferred embodiment of the novel lure in accordance with the present invention.

FIG. 2 illustrates a first preferred embodiment of a lure 20 with cyclically reversing rotation of a blade member 40. Several common elements are shown, such as a blade member 40, a generally V-shaped wire form member 80 with first eyelet 60 and second eyelet 200, a weighted member 140, a hook 160, and a skirt 180. It should be noted that the elastomeric skirt 180 can be replaced with any other type of common elastomeric body member comprising at least one anatomical feature of a small creature such as a small fish, amphibian, mammal, reptile, mollusk, crustacean, bird, or insect. The improvement over common spinnerbaits is achieved through replacing the common swivel 100 of FIG. 1 with at least one non-swiveling link member that enables more than 360 degrees of rotation of a blade member 40 yet does not enable unlimited rotation of the blade member 40. One or more non-swivel-type link members provide a means for cyclically storing and releasing torsional potential energy within a constantly moving lure 20. It should be noted that a swivel 100 allowing unlimited rotation of a blade member 40, like that of prior art FIG. 1, does not provide any means for storing any torsional potential energy of a rotating blade member 40. In FIG. 2, a first link member 220 is shown coupled to a second link member 240, with the first link member 220 coupled to the first eyelet 60 of the wire form member 80 and the second link member 240 coupled to the blade member 40. In this first preferred embodiment, the first link member 220 is an elastomeric loop shape, and the second link member 240 is a metallic split ring shape. It is obvious from the closed perimeter shape of the first link member 220 and second link member 240 that unlimited rotation of the blade member 40 cannot occur as the lure 20 moves forward in a generally upright position. After rotating or spinning for a predetermined duration, the blade member 40 slows down and stops rotating as the blade member 40, first link member 220, and second link member 240 rotatably interfere with each other. This slowing down and pausing of the spinning blade member 40, as well as the mechanism by which the blade member 40 then cyclically alternates its direction of rotation, are both explained in detail using the illustrations of FIGS. 3A-3E.

Figure 3E:
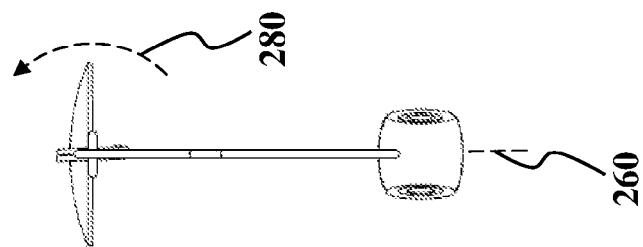
FIGS. 3A-3E are diagrammatic front views of the first preferred embodiment, with elastomeric skirt removed, shown in sequential order to explain the cyclical reversal of the blade member rotation that occurs as the lure is pulled forward at a constant speed.
Figure 3D:
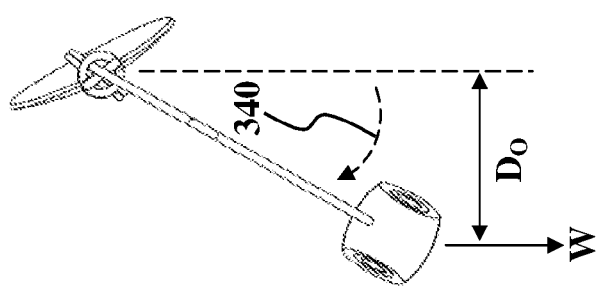
Figure 3C:
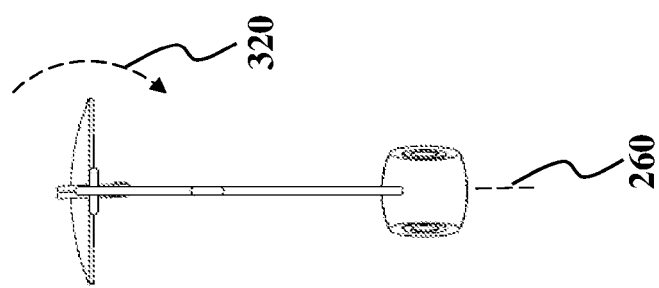
Figure 3B:
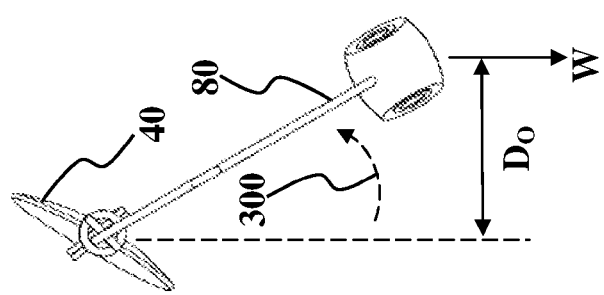
Figure 3A:
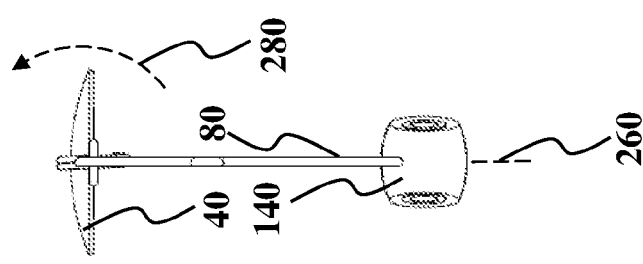

FIGS. 3A-3E show consecutive front views of the first preferred embodiment and sequentially describe two cycles of rotational direction reversal of the blade member 40. The elastomeric skirt 180 has been removed from the preferred embodiment in FIGS. 3A-3E to make the behavior of the lure 20 easier to visualize. While it may seem complex and non-obvious, this sequence of consecutive steps defining lure 20 behavior is actually quite simple. In FIG. 3A, the weighted member 140 is shown centered in a generally neutral position 260, and the blade member 40 is shown already rotating in a counterclockwise direction 280. The blade member 40 will continue to rotate in a counterclockwise direction 280 until the link members lock up or bind as their potential energy relative to the wire form member 80 reaches a temporary maximum. At that instant, the rotation of the blade member 40 will come to a temporary halt.

FIG. 3B shows the orientation of the lure just moments after the link members bind and pause the rotation of the blade member 40. The hydrodynamic rotational force on the blade member 40 still attempts to turn the blade member 40 in a counterclockwise direction 280 with a slight twist torque even though the blade member 40 is prevented from further rotation by the binding of the link members. However, with the blade member 40 being momentarily locked and unable to move, the twist torque is instead transmitted through the wire form member 80 and the result of this twist torque is to swing up both the wire form member 80 and the weighted member 140 with a momentary counterclockwise arc displacement 300. As the weighted member 140 begins to undergo the counterclockwise arc displacement 300, a restoring torque produced by gravity acting on the swinging weighted member 140 will begin to develop. The restoring torque is mathematically defined as "($D_O$)," or offset distance "$D_O$" multiplied by weighted member weight "W," and one can see that the restoring torque increases as the counterclockwise arc displacement 300 of the weighted member 140 increases. In other words, a larger twist torque from the stalled blade member 40 is required to swing the weighted member 140 with a greater counterclockwise arc displacement 300. If the hydrodynamic twist torque on the blade member 40 is too large and/or the mass of the weighted member 140 is too small, then the weighted member 140 will continue to rotate with a counterclockwise arc displacement 300 beyond 90 degrees and the entire lure 20 will begin to undesirably spin around in a corkscrew or helical type path as it is pulled forward. Conversely, if the weighted member 140 is of sufficient predetermined mass relative to the twist torque from the blade member 40, then the twist torque imparted on the weighted member 140 from the stalled blade member 40 will cause the weighted member 140 to desirably just twitch slightly with a smaller counterclockwise arc displacement 300 and limit the amount of weighted member 140 upswing or counterclockwise arc displacement 300 to below 90 degrees. Said differently, it is desirable that the magnitude of the twist torque equal to the magnitude of the restoring torque before the weighted member 140 reaches the 90-degree position. This slight upswing twitch pulse of the weighted member 140 generally defines the repeating angular displacement of the weighted member 140. From the perspective of an angler looking down on a moving lure 20, this slight angular displacement of the weighted member 140 appears as a momentary sideways pulse or twitch of the lure 20. With the blade member 40 rotation paused, and with the weighted member 140 now also paused slightly at a distance $D_O$ offset from the neutral position 260 as a result of the twist torque now equaling the restoring torque, one might think that the lure 20 would continue to translate forward in the water in this seemingly stalled blade member 40 orientation and stalled weighted member 140 orientation. However, there is one other significant force at work on the lure 20. Recall that while the blade member 40 was initially rotating, the first link member 220 and second link member 240 were also turning, essentially "winding up" the chain of link members much like a torsion spring. After the blade member 40 and weighted member 140 both pause or stall in an orientation similar to that of FIG. 3B, there is also a remaining hydrodynamic force pushing rearward on the coiled link members from the incident water pressure exerted on the forwardly-moving lure 20. Said differently, as the lure 20 continues to move at a constant speed, this remaining hydrodynamic force pushes on the link members in a direction opposite to the traveling direction of the lure 20. This hydrodynamic force pushes against the temporarily locked link members in a manner as to cause the link members to begin to uncoil or unlock from one another. The slight unraveling of the link members provides just enough freedom to cause the blade member 40 to now begin turning in an opposite or clockwise direction 320. At this same instant, the weighted member 140—no longer under the influence of a "twist torque" from a stalled blade member 40—swings back down due to gravity and returns to the bottom neutral position 260. It should be understood that this "uncoiling" of one or more link members can be sped up and/or made smoother by using an elastomeric material for one or more link members. An elastomeric link member can store additional torsional potential energy as the link members are "wound up" by the rotating blade member 40, such that the link members unravel or uncoil with a faster rotational speed than if the link members were each made from a rigid and inflexible material.

FIG. 3C shows the lure 20 moments later and generally aligned back in the neutral position 260. This time, the blade member 40 is continuing to rotate in the opposite or clockwise direction 320. Said differently, the state of the lure 20 in FIG. 3C is similar to the state of the lure 20 in FIG. 3A, but with the blade member 40 now spinning in a clockwise direction 320.

FIG. 3D is similar to FIG. 3B, and it illustrates the momentary condition of the lure 20 when the now clockwise direction 320 rotation comes to a halt as a result of the wound up and binding link members. When the blade member 40 again stops rotating, the hydrodynamic force still trying to turn the blade member 40 will again impart a twist torque on the lure 20 that will be transmitted to the weighted member 140. The weighted member 140 will now twitch slightly with a clockwise arc displacement 340 until the magnitude of the restoring torque "$(D_O)(W)$" equals the magnitude of the twist torque. Then, with the blade member 40 and weighted member 140 both stalled, the remaining hydrodynamic force still pushing rearward on the link members again acts to begin to uncoil the link members. The slight uncoiling or loosening of the link members provides enough freedom for the blade member 40 to begin rotating in an opposite or counterclockwise direction 280. With the blade member 40 now rotating in the same original counterclockwise direction 280, the entire lure 20 then returns to the neutral position 260 in as shown in FIG. 3E. The state of the lure 20 in FIG. 3E now matches the original state of the lure 20 in FIG. 3A. FIGS. 3A-3E illustrate two complete blade rotation reversal cycles. This "cyclically reversing blade member 40 rotation direction with corresponding weighted member 140 twitch motion" repeats indefinitely as long as the lure 20 is moving forward at a generally constant speed. Although seemingly lengthy to explain in words, the entire sequence from FIG. 3A to FIG. 3E can take less than a second to complete depending on the mass, shape, and material of the blade member 40, link members, weighted member 140, and retrieval speed of the lure 20.

Note that if the mass of a weighted member 140 is significantly larger than the mass of a blade member 40 and if the blade member 40 is of a desired predetermined size, then it is possible for the twist torque—originally transmitted from a stalled blade member 40 to the weighted member 140—to be transmitted back to the blade member 40 and cause the blade-member portion of the lure 20 to undergo each cyclical angular displacement noticeably more than the weighted member 140 portion of the lure 20. Said differently, the blade member 40 can exhibit or display each angular displacement pulse in between each change in blade rotation direction if the weighted member 140 is significantly heavier than the blade member 40. Conversely, if the weighted member 140 is not significantly heavier than the blade member 40, then the weighted member 140 will exhibit the visually greater angular displacement pulse in between each change in blade rotation direction, as taught by FIGS. 3A-3E.

Figure 4A:
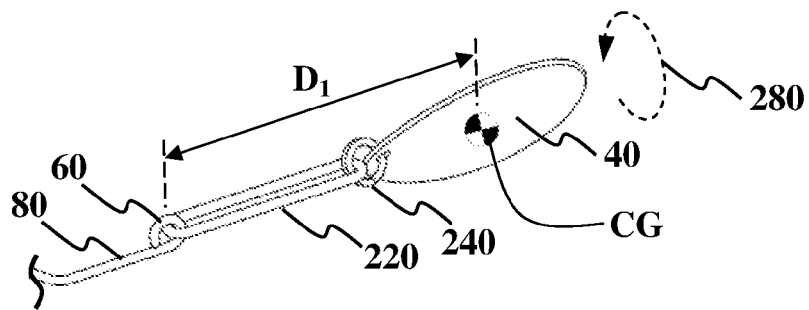
FIGS. 4A-4D are diagrammatic perspective views of the link member portion and blade member portion of a lure in accordance with the present invention, illustrating how the distance between the first eyelet and blade member cyclically changes as the blade member rotation direction cyclically alternates as the lure moves forward.
Figure 4B:
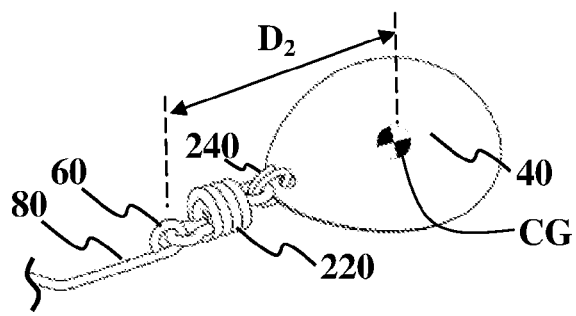
Figure 4C:
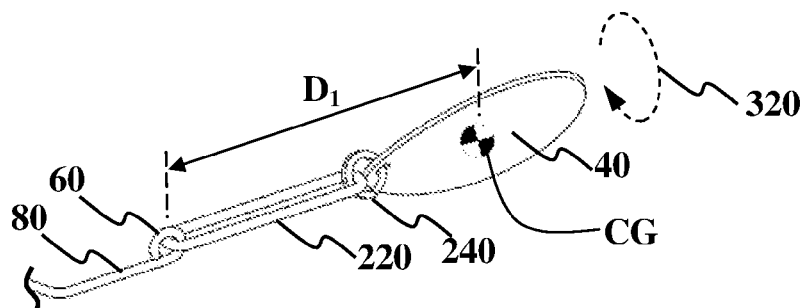
Figure 4D:
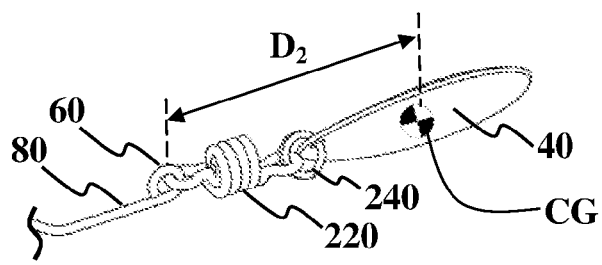

An alternate method to characterize the lure behavior taught by FIGS. 3A-3E is by illustrating the corresponding cyclically-alternating distance between the blade member 40 and first eyelet 60 of the wire form member 80 as the lure 20 moves forward at a generally constant speed, as shown in FIGS. 4A-4D. FIG. 4A illustrates an arbitrary starting orientation of a link-member-and-blade portion of the lure 20, wherein at a predetermined instant in time a first link member 220 and second link member 240 are fully unraveled and in their unwound, or tensionless, state. In the portion of an embodiment shown by FIGS. 4A-4D, the first link member 220 is made from an elastomeric material, and the second link member 240 is made from a metallic material, similar to the arrangement of FIG. 2. In FIG. 4A, the blade member 40 is rotating in a counterclockwise direction 280 and the distance $D_1$ between the center of gravity CG of the blade member 40 and the first eyelet 60 is generally at a maximum value. As the lure 20 continues to move forward and at an instant of time later, the extended distance $D_1$ begins to shorten due to the link members beginning to twist upon each other or coil up together as the blade rotates. When the link members cannot wind up any further and the rotation of the blade member 40 momentarily stops, the distance between the CG of the blade member 40 and the first eyelet 60 is generally at a minimum "coiled up" dimension, or $D_2$, as shown in FIG. 4B. A fraction of a second later, the distance $D_2$ begins to increase as the coiled-up link members begin to unravel due to the blade member 40 having started rotating in the opposite, clockwise direction 320. Once $D_2$ increases to generally equal the original $D_1$ shown in FIG. 4C, the contracting-and-expanding-distance cycle will then begin to repeat itself as $D_1$ again shortens and approaches $D_2$ like shown in FIG. 4D, at which point the rotation of the blade member 40 momentarily stops before cyclically changing direction once again.

Figure 5:
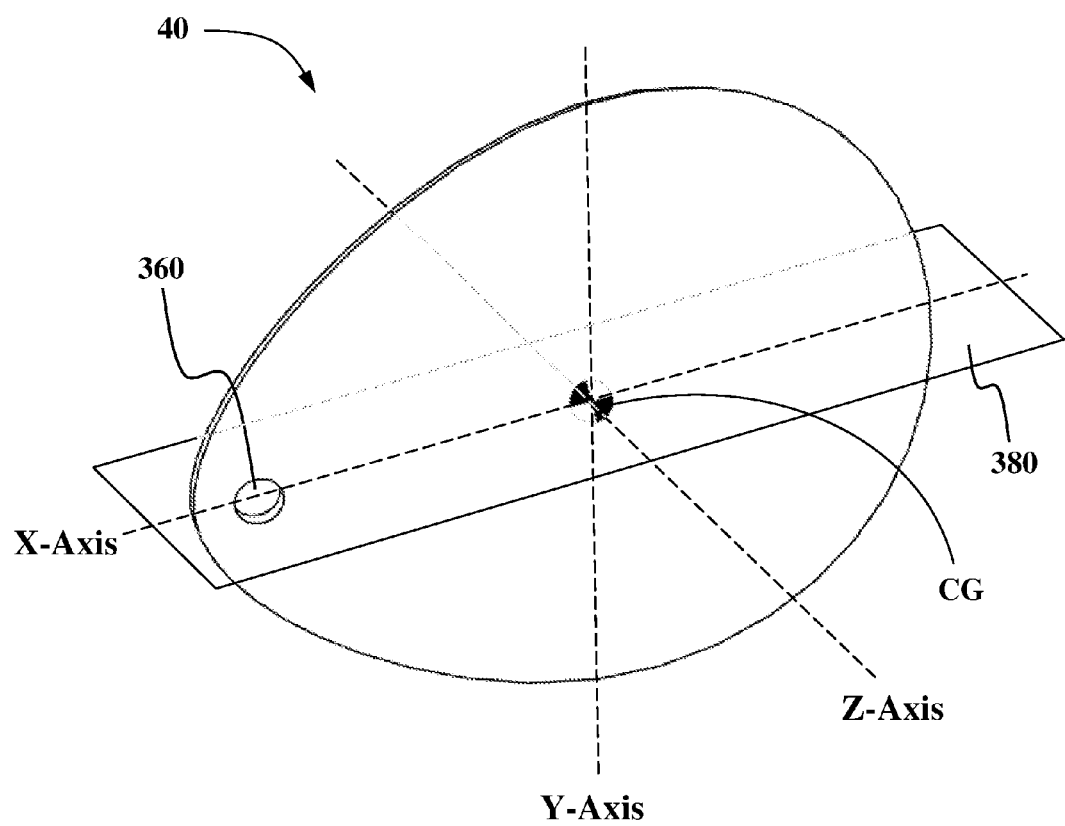
FIG. 5 is a diagrammatic perspective view of a blade member in accordance with the present invention.

FIG. 5 is a perspective view of a blade member 40, with an X-axis, Y-axis, and Z-axis assigned to help describe optimum blade member 40 orientation on the lure 20. The blade member 40 contains a mass evenly distributed about a center of gravity CG, and the blade length along the X-axis is generally larger than the blade width across the Y-axis, with both blade length and width being substantially larger than blade thickness in the Z-axis. In FIG. 5, the blade member 40 includes a first aperture 360 located along a median plane 380, with the median plane 380 dividing the blade member 40 into two generally equal portions and passing through the X-axis. Because it has mass and a defined shape, the blade member 40 also comprises a resistance against rotational acceleration known as the mass moment of inertia (I). This mass moment of inertia property can be divided into the following components: the mass moment of inertia around the X-axis ($I_X$), the mass moment of inertia around the Y-axis ($I_Y$), and the mass moment of inertia around the Z-axis ($I_Z$). From physics, it is known that for a body such as a flat plate comprising different dimensions for length, width, and thickness, the most stable rotation occurs around the two axes corresponding to the largest and smallest mass moments of inertia. For the geometry of the blade member 40 shown in FIG. 5, this means that the most stable rotation—the type of rotation most desired for this invention—occurs when the blade member 40 is constrained to rotate generally around the X-axis, Z-axis, or an axis located generally in or near the X-Z plane, which is the same plane as the median plane 380. Attempting to rotate the blade member 40 around the Y-axis would result in a more unstable fluttering or swaying movement of the blade member 40, and such undesirably erratic and unpredictable movement is not the same as the rhythmically alternating clockwise and counterclockwise rotations described by this invention. For the most rhythmic cycling of the lure 20 as described in FIGS. 3A-3E, it is recommended that the first aperture 360 be generally located somewhere along or near the median plane 380.

Figure 6C:
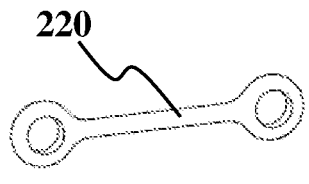
Figure 6C:
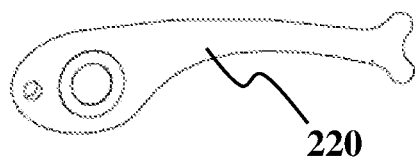
Figure 6C:
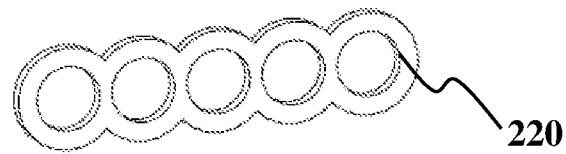

A first link member 220, or any link member of the lure 20, can be a closed loop-type shape or an open-type shape. Three additional examples of a first link member 220 are shown in FIGS. 6A-6C. In FIG. 6A, the first link member 220 is shown as generally a straight shape with an aperture at each end. In FIG. 6B, the first link member 220 is formed in the shape of a small baitfish. Note that a first link member 220 or any link member can be shaped to comprise any anatomical feature of a small creature such as a small fish, amphibian, mammal, reptile, mollusk, crustacean, bird, or insect. The tail-shaped or generally rearward end of the first link member 220 in FIG. 6B does not contain an aperture, as it is possible for any end of a first link member 220 to be coupled to a blade member 40 simply by pushing one flared or wider end of a first link member 220 through an elongated mating aperture or slot in a blade member 40. In FIG. 6C, the first link member 220 comprises multiple apertures, enabling an angler to choose which aperture to couple to a first eyelet 60, second link member 240, or blade member 40 in order to desirably increase or decrease the frequency at which blade rotation reversals occur. Again, the shapes of the link members shown in FIGS. 6A-6C can be applied to any link member and are not restricted to being alternate shapes of just the "first" link member in a chain of one or more link members. The shapes of the first link member 220 shown in FIGS. 6A-6C are optimized for elastomeric or flexible plastic materials, although any material can be used as long as the first link member 220—either by itself or in combination with other link members—enables at least 360 degrees of rotation of the mating blade member 40 and can withstand the thousands of wind-up and wind-down cycles that the blade member 40 will undergo during its useful life.

Figure 7:
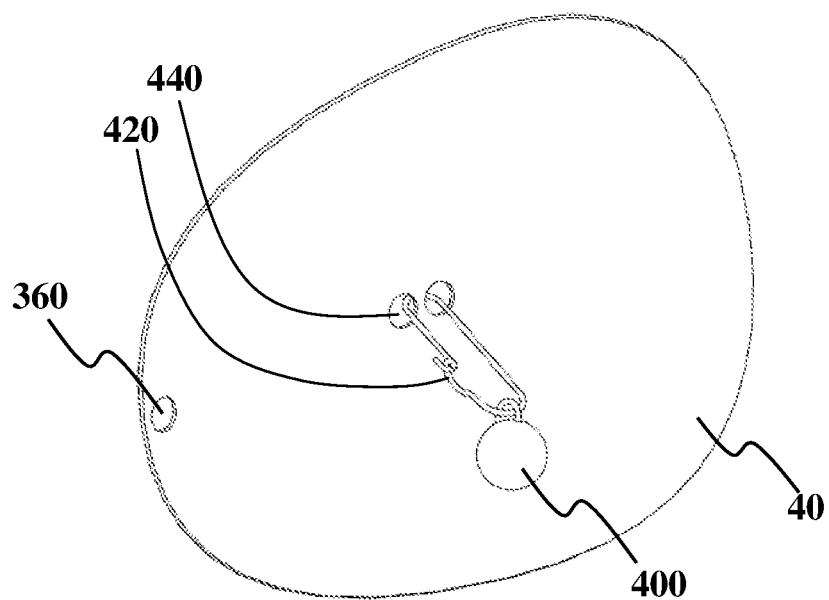
FIG. 7 is a diagrammatic perspective view of a blade member with a rattle member attached, in accordance with the present invention.

At least one rattle element 400 can be combined with at least one blade member 40 in order to create additional fish-attracting sounds each time the blade member 40 changes rotation directions. In FIG. 7, a rattle element 400 is shown pivotally coupled to a blade member 40 through a rattle linking member 420 passing through a rattle-attachment aperture 440. The rattle element 400 rotates in the same direction as the blade member 40 until the blade member 40 changes rotation direction, at which point the rattle element 400, due to its continued angular momentum, impacts the blade member 40 and emits an impulse-type sound into the surrounding water. Note that if a rattle element 400 were similarly attached to a blade member 40 of a common spinnerbait like that shown in FIG. 1, such a rattle element 400 would not emit such periodic impulse-type sounds since the blade member 40 on a common spinnerbait continuously rotates in one direction due to a swivel 100 and does not momentarily stop rotating in order to allow the impact of a rotating rattle element 400 into a paused blade member 40. In addition to being pivotally coupled to a blade member 40 like shown in FIG. 7, a rattle element 400 could also be loosely or slidably coupled to a blade member 40 or any link member.

Figure 8:
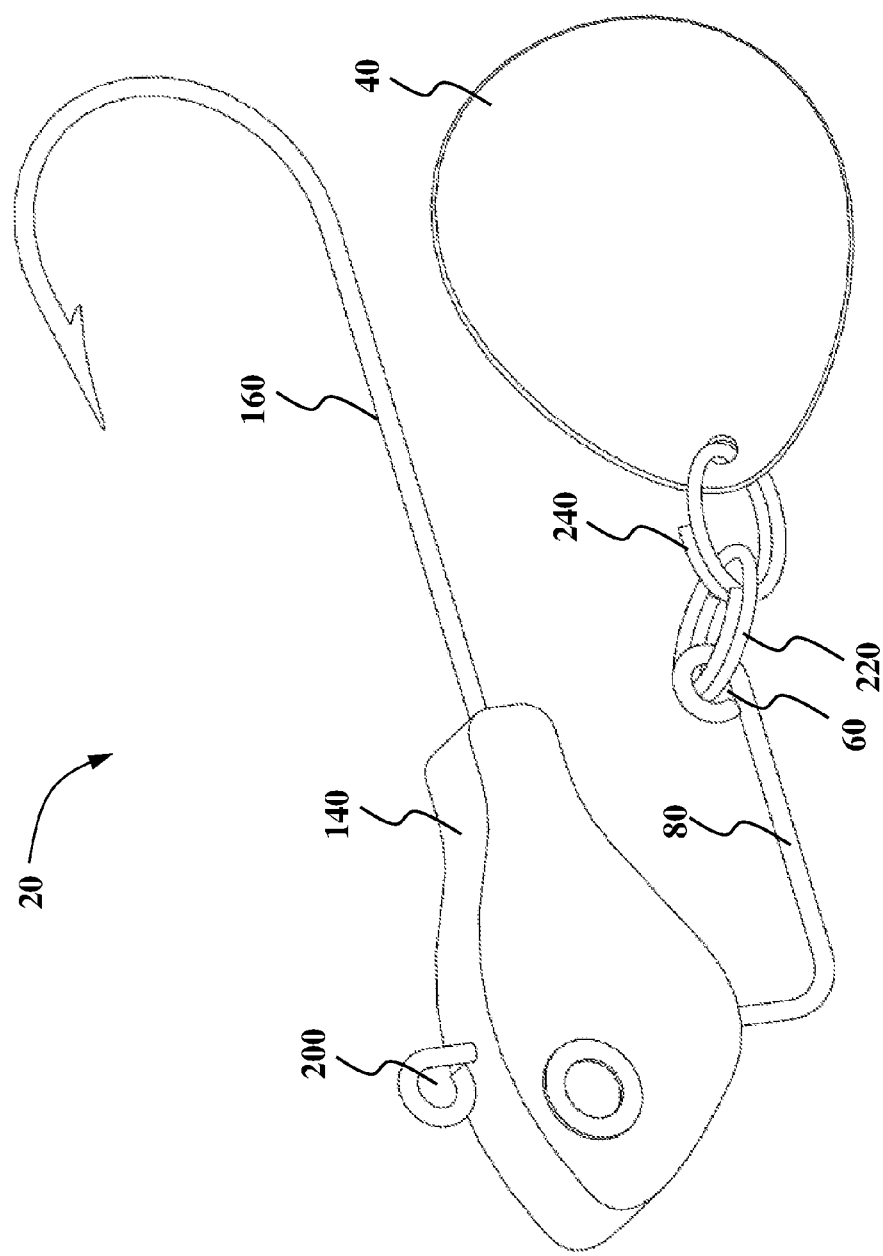
FIG. 8 is a diagrammatic perspective view of a second preferred embodiment of a lure in accordance with the present invention.

FIG. 8 is a second preferred embodiment of the lure 20 also comprising a first link member 220 and a second link member 240. However, in this preferred embodiment, both link members are metallic, loop-shaped members. The same basic components from FIG. 2 are also present in FIG. 8: a blade member 20, a wire form member 80, a weighted member 140, and a hook 160. The blade member 40 again cycles between counterclockwise rotation and clockwise rotation in the same manner previously described. An added benefit of using only metallic link members is the unique scraping and scratching sound of the binding link members that is transmitted into the surrounding water. Also, with all link members of this preferred embodiment being made of metal, the cyclical changes between rotation directions create more abrupt twitching motions of the lure 20. This metal-on-metal contact during the winding up and winding down of one or more link members can even be large enough that an angler can feel each cyclically binding and unbinding impulse of the link members as such pulses are transmitted up the fishing line and down through a fishing rod. Conversely, if an elastomeric link member replaced one or both of the stiff metallic link members, then the periodic twitch impulses transmitted through the fishing line and into the fishing rod would be much less in magnitude. The reason is because compared to a metallic link member, an elastomeric link member can store more "wound up" torsional potential energy and results in more of a rhythmically whirring vibration pattern underwater instead of the periodic metal-on-metal scraping sounds that rigid metal link members produce. Alternatively, one may use a thin, closed-loop, braided metal cable as one or more of the link members in order to achieve partial benefits of both elastomeric link members and stiff metallic link members.

Figure 9E:
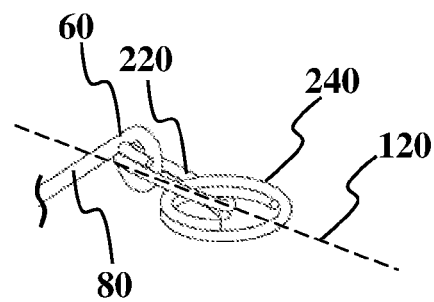
Figure 9E:
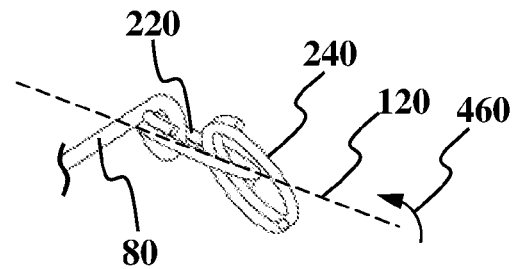
Figure 9E:
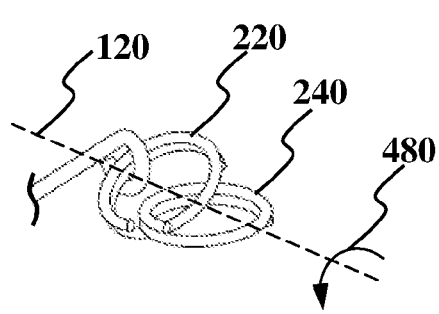
Figure 9E:
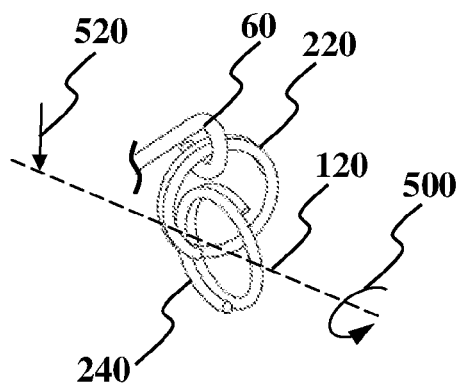
Figure 9E:
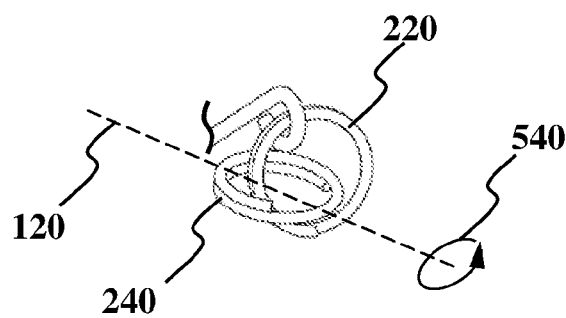

In order to enable the cyclically-alternating rotation behavior of a blade member 40 using two or more closed loop metallic link members like those shown in FIG. 8, one or more link members must be able to rotate more than 360 degrees or twist beyond 360 degrees around a rotation axis 120. Achieving this minimum of 360-degree rotation of at least one link member using two metallic ring-shaped link members is described in more detail in FIGS. 9A-9E, wherein a first link member 220 and second link member 240 couple a wire form member 80 to a blade member 40, similar to the arrangement of FIG. 8. An arbitrary "0-degree" generally-horizontal orientation of the second link member 240 is shown in FIG. 9A. In FIG. 9B, the second link member 240 is shown having rotated counterclockwise to a generally a 90-degree position 460 relative to the static wire form member 80. Note that the first link member 220 has not yet been required to rotate or move, since the second link member 240 is simply rotating within the closed boundary formed by the first link member 220. In FIG. 9C, the second link member 240 is shown in a 180-degree position 480, and the first link member 220 has been forced to also slightly rotate counterclockwise as a result of the contact force from the second link member 240. As the second link member 240 continues to rotate further, the first link member 220 must now pivot inward towards the wire form member 80, as shown in FIG. 9D, in order to allow the second link member 240 to continue rotating to approximately a 270-degree position 500. Note that the rotation axis 120 of the second link member 240 is still generally parallel to the direction of lure travel, but the rotation axis 120 of the second link member 240 has now experienced an axial shift 520 due to the inward pivot of the first link member 220 such that the rotation axis 120 no longer passes through the first eyelet 60. This is unlike the position of the rotation axis 120 in FIGS. 9A-9C, which does pass through the first eyelet 60. This axial shift 520 is a significant difference between the invention described herein and prior-art spinnerbaits that utilize a swivel 100. If a swivel 100 is used to join a blade member 40 to a wire form member 80, then the rotation axis 120 of the swivel 100 always passes through the first eyelet 60 to which the swivel 100 is pivotally attached. However, in the case of this invention, in order to enable more than 360 degrees of rotation of a link member yet also prevent unlimited rotation of said link member, the one or more flexible or inflexible link members can be sized and/or coupled together such that the rotation axis 120 is allowed to undergo such an axial shift 520. Continuing to FIG. 9E, the second link member 240 has undergone one complete counterclockwise revolution and is shown in a 360-degree position 540. In other words, the generally-horizontal orientation of the second link member 240 in FIG. 9E now matches the generally-horizontal orientation of the same second link member 240 shown in the original FIG. 9A.

It should again be noted from FIGS. 9A-9E that although one or more link members enable more than 360 degrees of rotation of said one or more link members and any additionally-coupled blade member 40, said one or more link members do not enable the unlimited rotation of a coupled blade member 40. For example, at a predetermined angular orientation beyond 360 degrees after the instant captured by FIG. 9E, the first link member 220 and second link member 240 will momentarily bind together and briefly stop rotating prior to the blade member 40 beginning to rotate in the opposite direction, in the same general manner as previously taught by FIGS. 3A-3E.

Note that if a link member is made from a flexible material such as an elastomeric or plastic material, then at a minimum only one link member is required, as a flexible material can enable more than 360 degrees of rotation through the stretchable and/or twistable behavior of elastomeric and plastic materials. However, if all link members are formed into a rigid shape from a stiff material, such as a closed-loop shape like the metallic link members of FIG. 8, then more than one link member is required in order to enable rotation of a blade member 40 beyond 360 degrees. In other words, with a rotation axis 120 defined as an axis generally parallel to the direction of lure travel, it is not possible for a single closed-loop shaped link member to rotate 360 degrees about such a rotation axis 120 relative to an eyelet of a wire form member 80 to which the link member is pivotally coupled. Thus, if the swivel 100 in the prior art of FIG. 1 were replaced with a single stiff metallic ring-shaped link member, the required "360 degrees of rotation or beyond" would not be possible with such a single metallic ring-shaped link member. Said differently, if a single metallic ring-shaped link member replaced the swivel 100 of FIG. 1, then only a "darting" or "swaying" type motion of a link member would be enabled, and not the cyclically-alternating rotation-type behavior of this invention. In order to enable the desired "minimum 360 degrees of rotation" of a blade member 40 of this invention, a minimum of two rigid link members is required, or a minimum of one flexible link member is required. It should be noted that while one could use a thin string or fishing line for any link member, such a material would be more easily nicked, stretched, or cut by the cyclically-rotating blade member 40. Any link member made from a string, line, cord, cable—or similar-type material capable of resisting a tensile force but not capable of resisting a significant compressive force—must be of sufficient thickness to ensure link member durability during the thousands of repeating cyclical rotations of a blade member 40 during the useful life of the lure 20.

Figure 10:
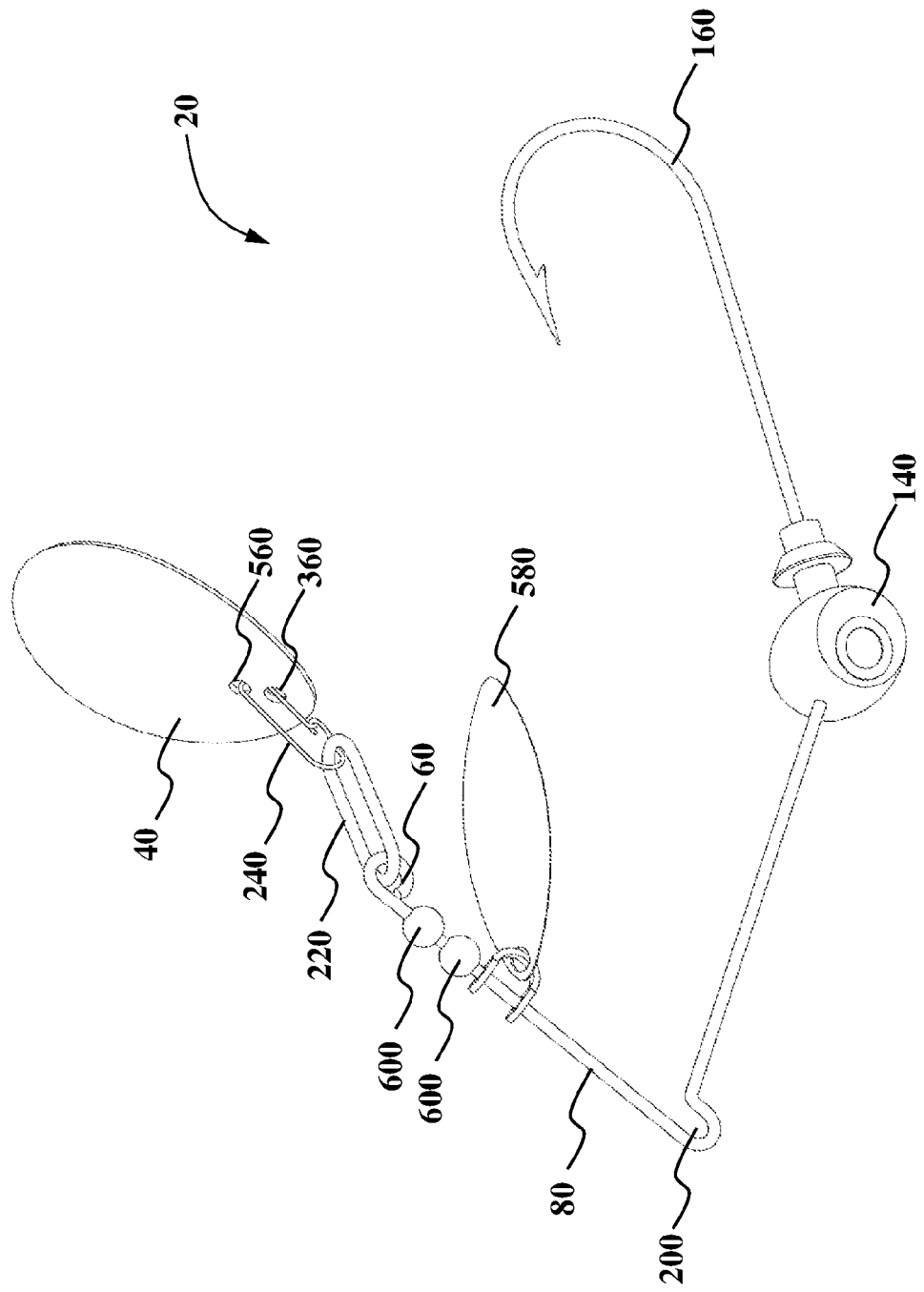
FIG. 10 is a diagrammatic perspective view of a third preferred embodiment of a lure in accordance with the present invention.

FIG. 10 illustrates a third preferred embodiment of the lure 20. A first link member 220 and second link member 240 again couple a wire form member 80 to a blade member 40. A hook 160 and weighted member 140 are also coupled to the wire form member 80. The second link member 240 is now a metal clip that passes through both a first aperture 360 and a second aperture 560 of the blade member 40, as compared to the previous preferred embodiments wherein the blade member 40 only comprised a first aperture 360. A separate spinner 580 is also now attached as an additional fish attracting element, and this spinner 580 freely rotates in an unlimited manner around the wire form member 80 as the lure 20 moves forward. At least one spacer member 600 can be used to help prevent rotational interference between the freely rotating spinner 580 and the cyclically rotating blade member 40.

Figure 11:
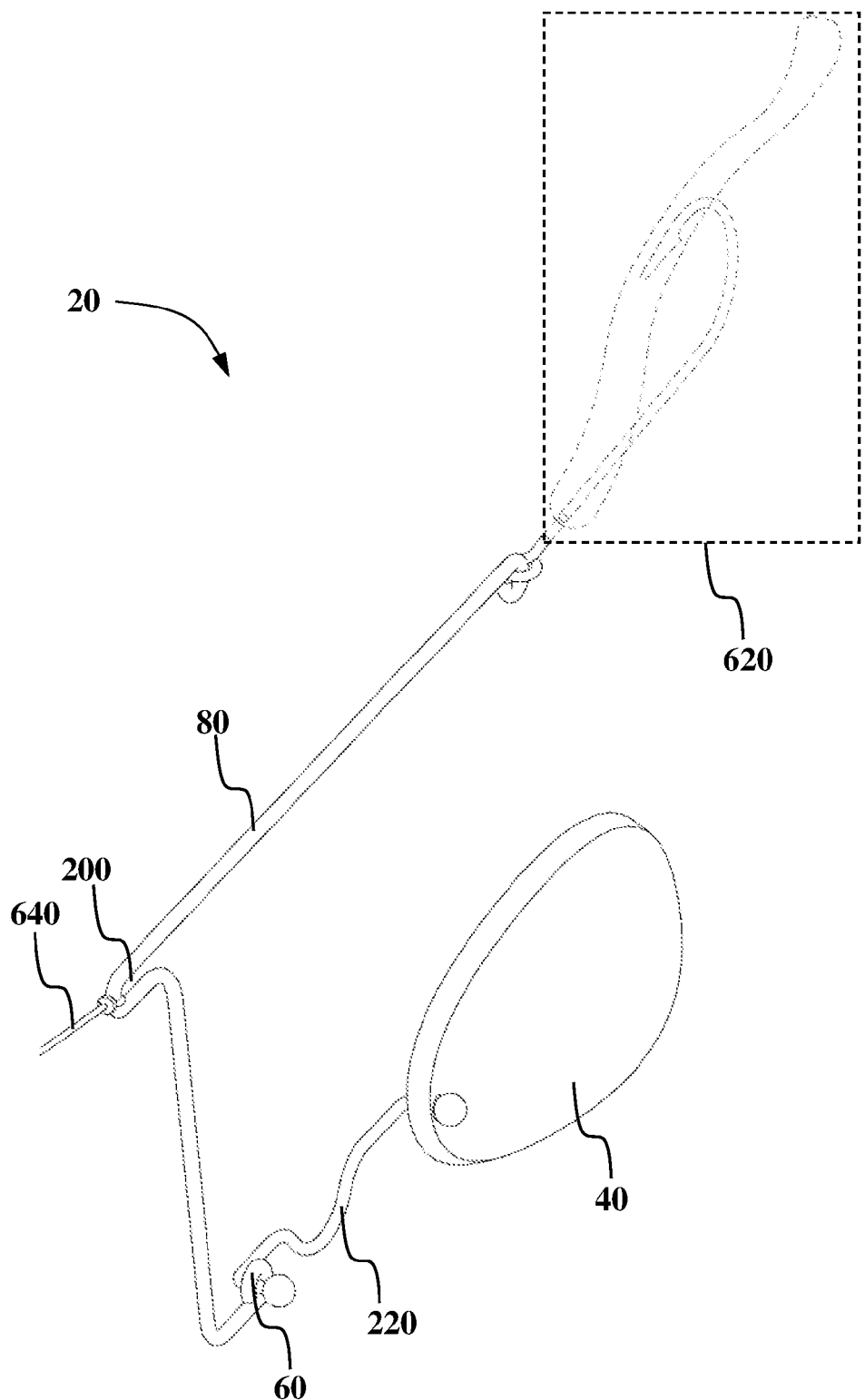
FIG. 11 is a diagrammatic perspective view of a fourth preferred embodiment of a lure in accordance with the present invention.

If the weight of a blade member 40 is sufficiently large enough to cause the lure 20 to sink to the desired fishing depth, then a separate or distinct weighted member 140, similar to that shown in previous preferred embodiments, is not required. As a result, the lure 20 can simply consist of a wire form member 80, one or more blade members 40, and one or more link members. FIG. 11 is a fourth preferred embodiment a lure 20 wherein a heavier blade member 40 is attached to a generally U-shaped wire form member 80 through a single, flexible first link member 220 coupling the blade member 40 to the first eyelet 60. A fishing line 640 is also now shown coupled to the second eyelet 200, and a first baited member 620 of predetermined shape is also now coupled to the wire form member 80. Although the blade member 40 in FIG. 11 is attached to a shorter leg or shorter portion of the wire form member 80, attachment of a blade member 40 to a shorter portion of a wire form member 80 is not necessary in this preferred embodiment or any preferred embodiment in order for the blade member 40 to achieve the cyclically rotating motion as previously taught and described.

Figure 12:
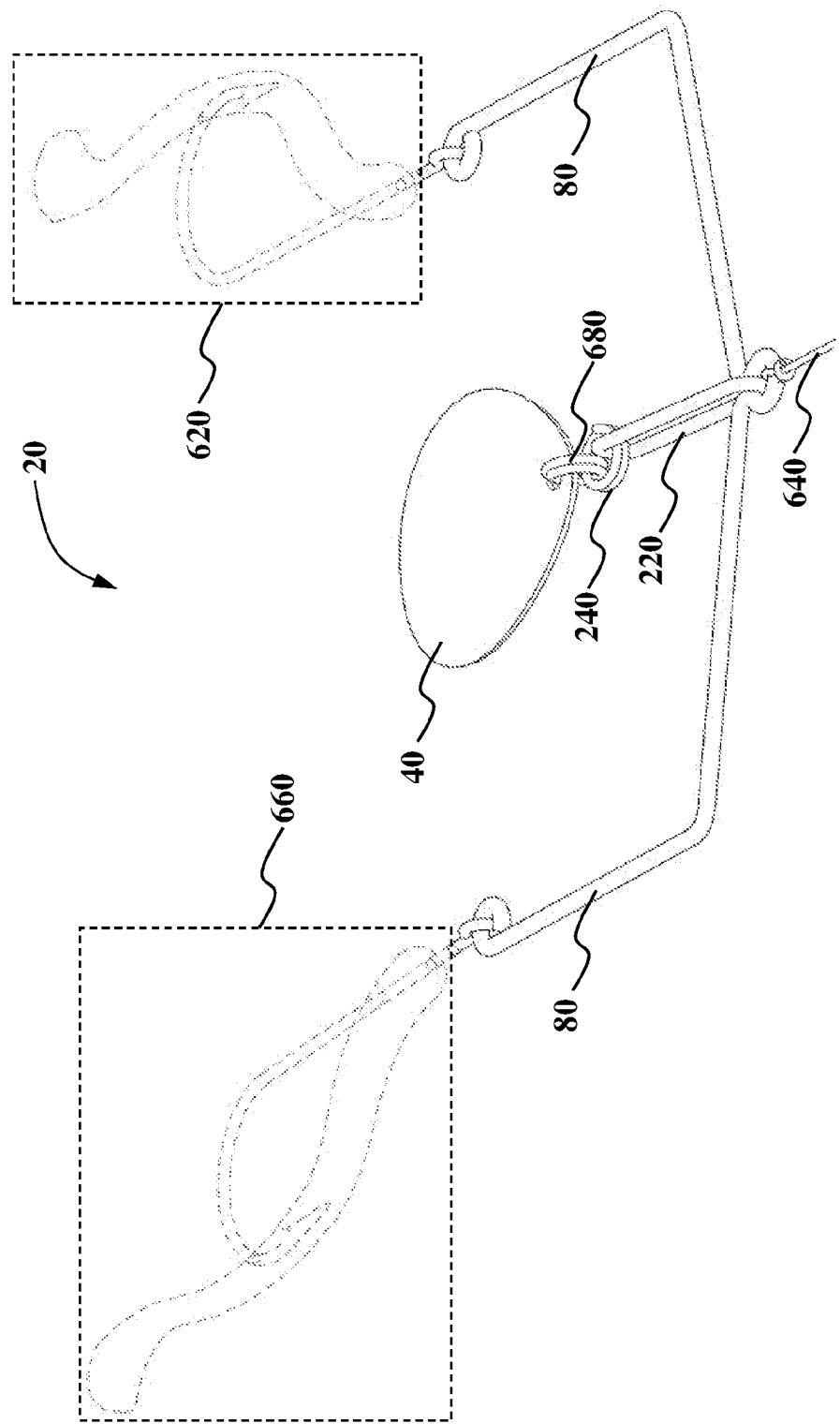
FIG. 12 is a diagrammatic perspective view of a fifth preferred embodiment of a lure in accordance with the present invention.

FIG. 12 is a fifth preferred embodiment of the invention wherein a wire form member 80 extends to surround a blade member 40 on two sides. Although shown with all portions of the wire form member 80 lying in a single plane, the wire form member 80 can be slightly bent into a slight V shape or any other shape, with portions of the wire form member 80 lying in more than one plane. A first baited member 620 and a second baited member 660 are attached to the terminal ends of the wire form member 80. A third link member 680 is shown, but not necessary, and additionally couples the blade member 40 to the wire form member 80. If the first baited member 620 and second baited member 660 are generally buoyant, then the lure can travel through the water in a general horizontal orientation as depicted in FIG. 12, with the lure still cyclically twitching or pulsing sideways with the each change in rotation direction of the blade member 40. The wire form member 80 can comprise more legs than the two legs shown in FIG. 12, more than one wire form member 80 can be joined together, and the blade member 40 can also be coupled to any point along a wire form member 80. For example, a four-legged wire form member 40—made from multiple wire forms joined together—can comprise four terminal ends, each terminal end connected to a baited member, and one or more blade members 40 coupled to any location along any wire form member 80 through one or more link members.

Figure 13:
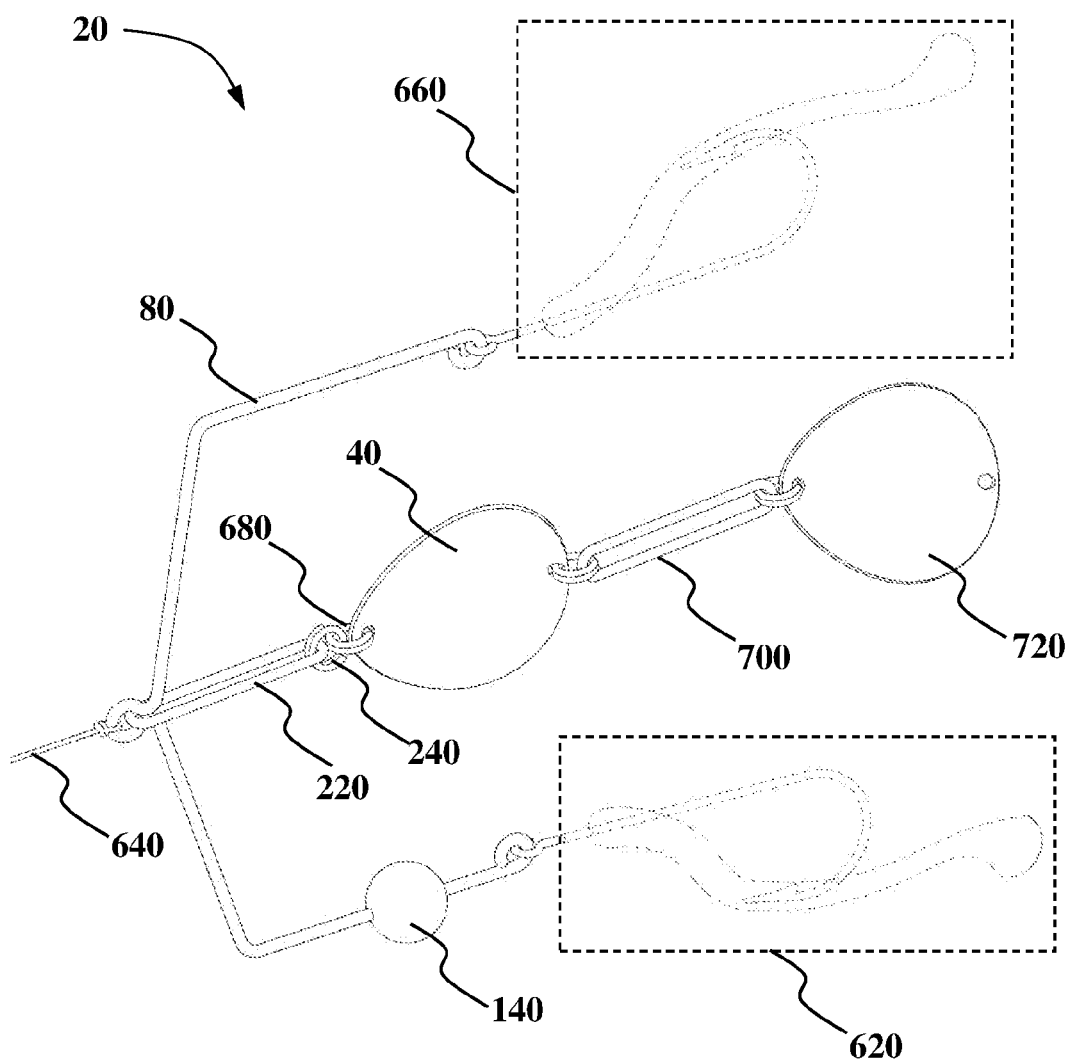
FIG. 13 is a diagrammatic perspective view of a sixth preferred embodiment of a lure in accordance with the present invention.

FIG. 13 illustrates a sixth preferred embodiment of the lure 20 and is similar to the preferred embodiment of FIG. 12, but the lure 20 further comprises a fourth link member 700 and a second blade member 720. In addition, a weighted member 140 has been added back to the lure 20 to help define a heavier side or bottom side of the lure 20 and enable the lure 20 to swim in a generally upright or vertical orientation like shown. The advantage of the fourth link member 700 is that it provides a means for an additional, cyclically-alternating blade that further enhances the momentary angular twitch motions of the lure 20, which already occur due to the cyclically-alternating rotations of the first blade member 40. A further advantage is that the two distinct cyclically rotating blade members can be interpreted by a nearby game fish as two independently-struggling baitfish and/or provide an even more erratic and random underwater vibration signature of the lure 20. It should be obvious that the fourth link member 700 can also simply be replaced with a common swivel 100 like the swivel 100 of FIG. 1, such that the second blade member 720 spins continuously only in one direction while the first blade member 40 cyclically changes rotation direction as previously taught and described by FIGS. 3A-3E.

Figure 14:
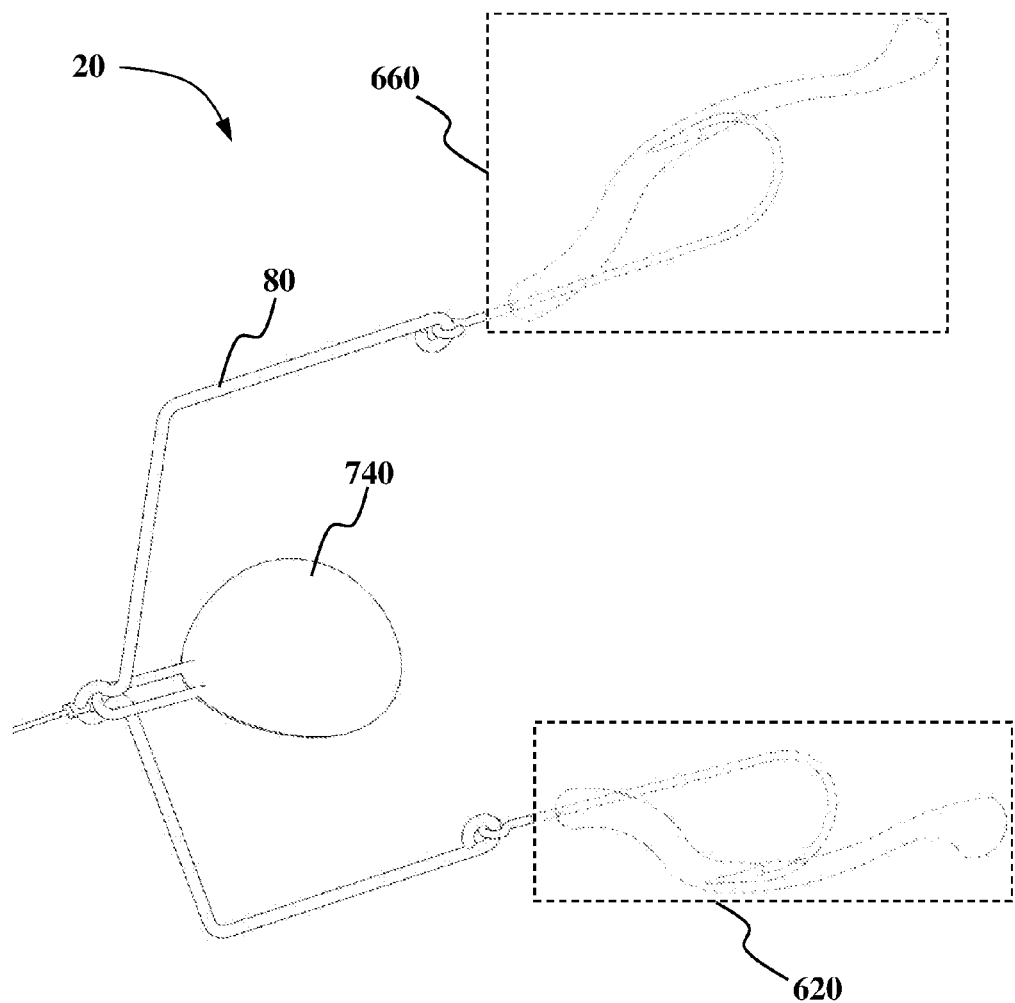
FIG. 14 is a diagrammatic perspective view of a seventh preferred embodiment of a lure in accordance with the present invention.

FIG. 14 shows a blade member 40 and link member now merged together to form a one-piece blade-and-link member 740 as part of a seventh preferred embodiment of the lure 20. This merger of a blade and a link member can most commonly be achieved by forming the combined blade-and-link member 740 together from a flexible material, such as an elastomeric or plastic material. Alternatively, the blade portion can be a metallic material and the flexible link portion can be permanently bonded to the metallic blade portion through a gluing process, double-injection molding process, two-shot molding process, overmolding process, or other similar method known in the art for permanently bonding two dissimilar materials. The wire form member 80 and the combined blade-and-link member 740 together form an even simpler preferred embodiment of the novel lure 20 that still enables the same cyclically-alternating blade rotation previously taught and described.

Figure 15:
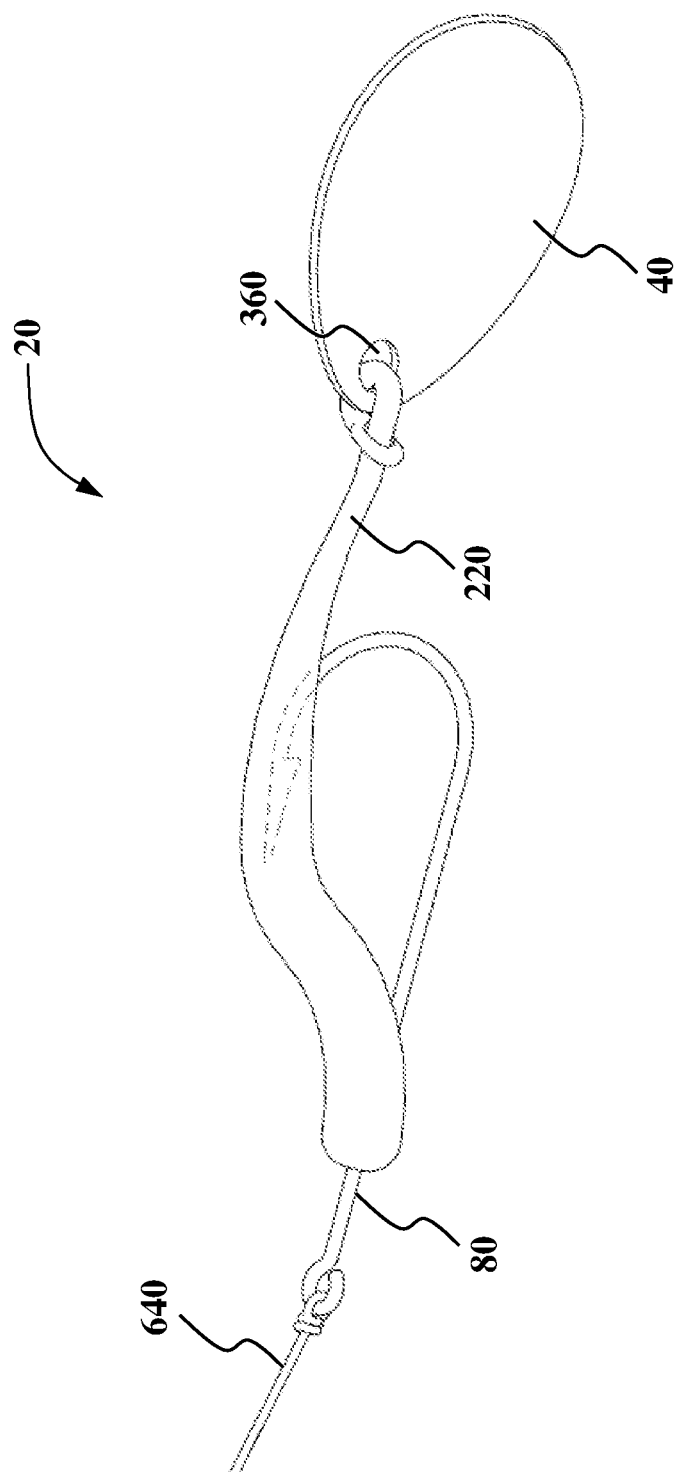
FIG. 15 is a diagrammatic perspective view of an eighth preferred embodiment of a lure in accordance with the present invention.

Further embodiments falling within the spirit and scope of the present invention are certainly possible. One variation of the invention is an embodiment wherein a hook barb is formed by the wire form member 80. Said differently, a wire form member 80 can also comprise a terminal end in the shape of a sharp, barbed point designed to help secure a fighting fish to the lure 20. In addition, a link member can be secured to this hook-shaped portion of the wire form member 80, enabling a cyclically rotating blade member 40 to be positioned directly behind—and generally in line with—the hook-shaped portion. To further illustrate this, an eighth preferred embodiment is shown in FIG. 15, wherein a terminal end of the wire form member 80 is hook shaped, and an elastomeric first link member 220 has a shape like a small creature and extends rearward to pass through a first aperture 360 in a trailing blade member 40 before the first link member 220 loops back unto itself in order to secure the blade member 40 to the first link member 220, prior to the first link member 220 being coupled to the hook-shaped wire form member 80. Said differently, the creature-shaped elastomeric first link member 220 comprises a shaped aperture near a first end, such that the first end can pass through the first aperture 360 of a blade member 40, whereupon the shaped aperture end of the first link member 220 can then stretch and loop around the opposite end of the first link member 220 before being slid down securely against the blade member 40 in order to secure and couple the first link member 220 to the blade member 40. The flexibility or twistable nature of the elastomeric first link member 220 still enables the same cyclically-alternating rotation of the trailing blade member 40 relative to the fishing line 640.

Figure 16:
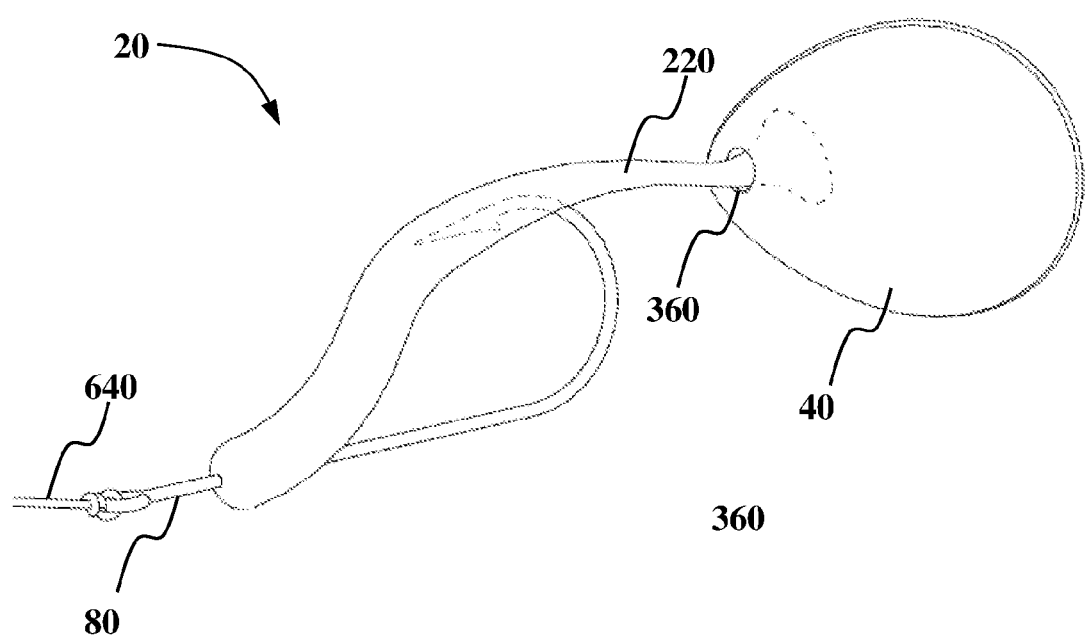
FIG. 16 is a diagrammatic perspective view of a ninth preferred embodiment of a lure in accordance with the present invention.

A slight variation of FIG. 15 is shown in FIG. 16, wherein a ninth preferred embodiment of the invention comprises an elastomeric first link member 220 passing through a slotted—and not necessarily circular—first aperture 360 of a blade member 40, and the first link member 220 is coupled to the blade member 40 by a terminal end of the first link member 220 having dimensions larger than the slotted first aperture 360 such that the blade member 40 remains coupled to the first link member 220 throughout normal use of the lure 20. It is also obvious that the separate blade member 40 and first link member 220 in FIG. 15 and FIG. 16 can be combined or merged together into a single member or part, in a similar method used to construct the blade-and-link member 740 of FIG. 14.

It should be emphasized that for a given mass of the weighted member, certain blade sizes and geometries can enhance the desired cyclical blade rotations and periodic weighted member twitches. For optimum behavior of the lure, the blade undergoing the cyclically-alternating rotation should have a generally curved geometry that defines a slight cup or concave shape. Alternatively, one side of a bladed member can be curved in shape and a different side can be generally flat, which can easily be accomplished if a bladed member is formed from a plastic material. The preferred blade shapes are those such as common "Colorado" blades, which have a broader shape or footprint as compared to "Willow Leaf" blades, which are more elongated and slender in shape. As a result of their broad shape, Colorado blades generally have a higher mass moment of inertia around the X-axis, or $I_X$, as compared to a Willow Leaf blade of the same length, and this can help better stabilize a moving lure in the neutral position in between the periodic twitches of the weighted member portion or blade member portion. Other common broad blade shapes known in the art of lure making are "Indiana" blades and "Oklahoma" blades, and each of these can help achieve a more desired lure motion versus a Willow Leaf blade. Similarly, for a given blade member footprint or size, a higher blade mass can also increase $I_X$ and help stabilize motion of the lure. However, it should be noted that depending on the mass of the weighted member and location of fishing line attachment to the lure, there is a limit to the blade size that can successfully be used, as a blade with too much surface area and/or too much mass can possess too much angular momentum for a given lure speed and given weighted member mass, and the resulting large twist torque transmitted from the blade to the weighted member can cause the entire lure to begin undesirably spiraling out of control in the water. On the other hand, a blade of too small a surface area and/or mass can lack enough angular momentum to fully wind up the chain of link members and cause the desired magnitude of the periodic twitching motion of the lure. If an angler wanted to retrieve the lure with a fast speed in order to make many casts to expose the lure to as much water as possible, then a smaller broad blade would be preferred. Alternatively, if an angler were fishing in colder months when fish are more lethargic and less likely to chase fast moving baits, then a larger broad blade would be ideal to help slow the cyclical frequency of the blade rotation reversals. Thus, there are optimum combinations of the "$I_X$" of a blade member and the mass of a weighted member that will result in the desired frequency and magnitude of both the rhythmic rotation direction changes of the blade and the cycling angular twitch motions of the lure.

The properties of an elastomeric material, when used for one or more link members, also play an important role in lure behavior. Softer or more stretchable elastomeric link members can allow the blade member to wind and unwind more smoothly and generate more consistent twitch pulses of the lure, all while creating a broader rhythmic whirring sound under water. Conversely, stiffer or harder elastomeric link members can create a more noticeable and less precise cyclical twitch pulse of the lure. For lure longevity, it is preferred that any elastomeric link member material not easily tear or crack, such that the material be able to withstand sustained exposure to the harsh outdoor environment found in freshwater and saltwater fishing.

The number of link members also affects lure behavior. Increasing the number of link members increases the time between the periodic twitches of the lure and increases the number of clockwise or counterclockwise rotations of a blade before a rotation direction reversal occurs. Alternatively, if an angler prefers an increased frequency of the periodic twitches of the lure for a given retrieval speed, then fewer link members can be used.

Ideally, the geometry of the wire form member near the first eyelet should be free of any burrs or kinks, and the end of the wire form member at the first eyelet location should be compactly formed and not protruding out where it could interfere with any of the twisting link members. Also, it is preferred that the opening width of any link member be less than the width of the first eyelet to which the chain of one or more link members is attached, so that any link member cannot accidentally loop around or "lasso" the first eyelet end of the wire form member as the link members cyclically wind and unwind. Having the first eyelet leg portion of the wire form member be generally parallel to an imaginary line passing through both the first eyelet and center of gravity of a hanging blade member can also help reduce the chance that a winding up link member will get caught by or wrap around the wire form member near the first eyelet location.

The location of the center of gravity of a blade member relative to the weighted member also affects lure behavior. Moving the blade member closer to the weighted member can result in slightly larger twitch pulse magnitude of the weighted member, while moving the blade further back from the weighted member can result in larger pulse magnitudes of the baited member area or rear portion of the lure relative to the pulse magnitude of the weighted member. Also, it is recommended that a rotation axis of a blade member generally not pass through the weighted member, in order to help keep the moving lure in a stable orientation and not easily cause the lure to spiral out of control.

There are many additional obvious variations of the preferred embodiments described herein. For example, one or more link members can be made from a woven, braided, or fabric material in addition to the plastic, elastomeric, and metallic materials previously described. Also, using a thin plastic film as one of the link members can allow for similar lure behavior as an elastomeric link member, and a plastic material would not degrade as easily after prolonged exposure to extreme temperatures and intense solar radiation. One or more link members can obviously and simply be a common torsion spring made from thin metal wire that is already pre-formed into a helical or spiral shape.

An alternate embodiment can comprise a fishing line coupled directly or indirectly to a link member, with the link member coupled directly to a cyclically-alternating blade member such that no separate wire form member is required. The weight of the link member can be made substantially heavier than or lighter than the weight of the blade member depending on the desired fishing depth and preferred lure behavior. Additionally, a link member and/or blade member can also be coupled to an eyelet, shank, or bend of any hook found on any pre-existing fishing lure. It should also be understood that any wire form member can be any shape in addition to those shown and described herein.

Although the exact amount or number of revolutions beyond 360 degrees that a blade member will undergo during each cycle before reversing its rotation direction depends on the predetermined dimensions and materials of one or more link members and one or more blade members, generally the "number of blade rotations per each repeating cycle of torsional potential energy" should be a low number in order for the moving lure to exhibit a higher and more visually noticeable frequency of the corresponding twitch pulses in order to optimally attract fish. In other words, it is more desirable for the blade member to change rotation directions frequently and cause the lure to twitch every foot or so during lure retrieval versus every 40 or 50 feet or so, with the latter not as desirable—but possible—as a result of an abnormally long or extremely thin link member coupled to an extremely small blade member. A lure that reverses blade rotation and generates twitch pulses every 50 feet of forward lure movement is less likely to have said twitch pulses detected by nearby game fish as compared to a lure that reverses blade rotation and generates twitch pulses every foot or so of forward lure movement. Thus, while the minimum number of blade rotations in between each change in blade rotation direction is "360 degrees" or "one revolution" in order to create the novel and distinct twitch pulses of the lure, a maximum number of blade revolutions in between each change in blade rotation direction can be on the order of approximately 50 revolutions in order to safely cover a broad frequency range of an angler's desired lure twitch pulses during normal lure retrieval speeds. Said differently, the materials and dimensions of any link members and blade members should be chosen such that between 1 and 50 blade revolutions occur in between each cyclical rotation reversal of a blade member. This still distinguishes the novel cyclically-alternating blade behavior of the invention from the unlimited rotating blade behavior of prior-art spinner lures.

Figure 17:
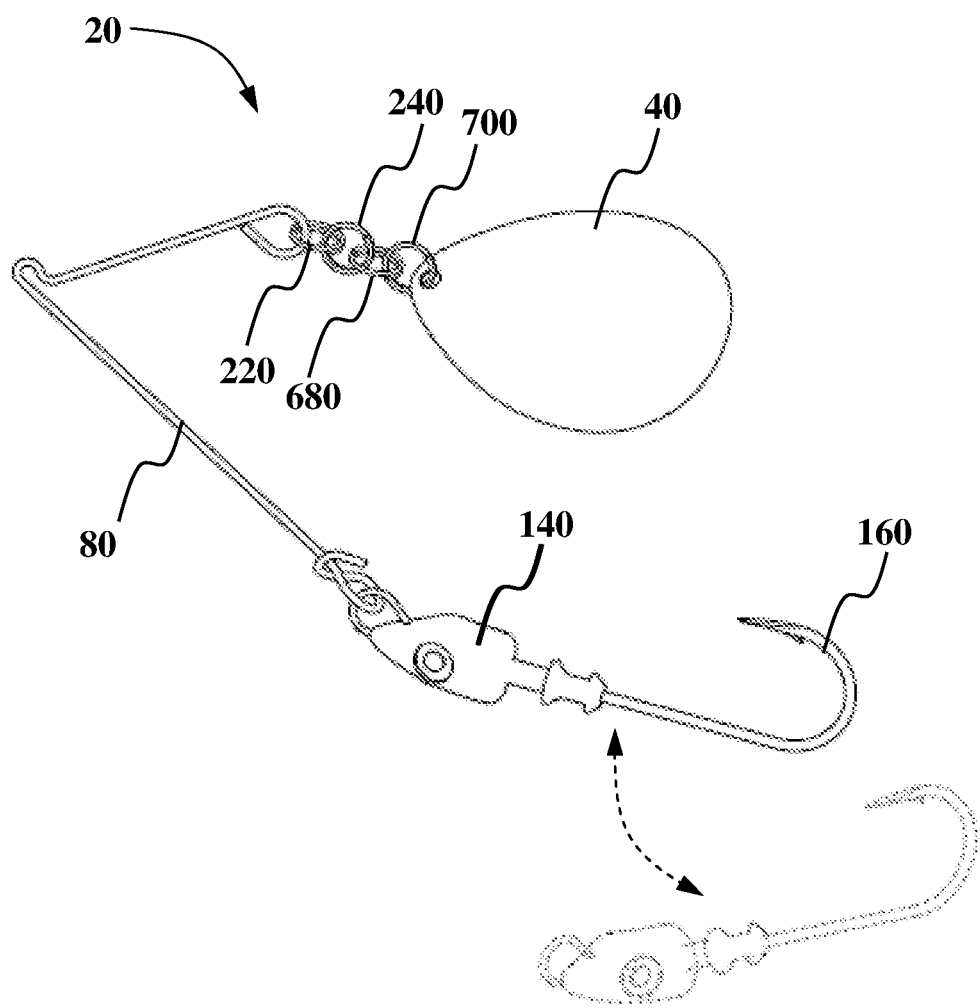
FIG. 17 is a diagrammatic perspective view of a tenth preferred embodiment of a lure in accordance with the present invention.

Similar to common "jig spinner" lures wherein a separate wire form member detachably and pivotally mounts to a weighted "jig head" hook, a wire form member of the invention can be a separate part that detachably mounts to a hook, and the weighted member can surround a portion of the hook instead of surrounding a portion of the wire form member, such that the hook passes through the weighted member. This embodiment is shown in FIG. 17, which depicts a blade member 40, a wire form member 80, a pivotally-mounted hook 160, a first link member 220, second link member 240, third link member 680, and fourth link member 700. It is obvious that FIG. 17 contains the same basic elements when compared with the embodiment of FIG. 2. Additionally, multiple wire form members can be rigidly joined or pivotally linked together in a chain-like fashion when constructing a portion of the lure. Said differently, the lure can be modular in construction.

It is also obvious that one or more additional rattle members can be coupled to either a wire form member, a hook, a weighted member, or a blade member through any of the means well known in the art of attaching rattle members to spinner lures. Adding at least one pre-existing rattle member would cause the lure to be even louder and more easily detected by fish, since each periodic twitch pulse of the lure would also cause corresponding rattle sounds from the rattle members.

Figure 18:
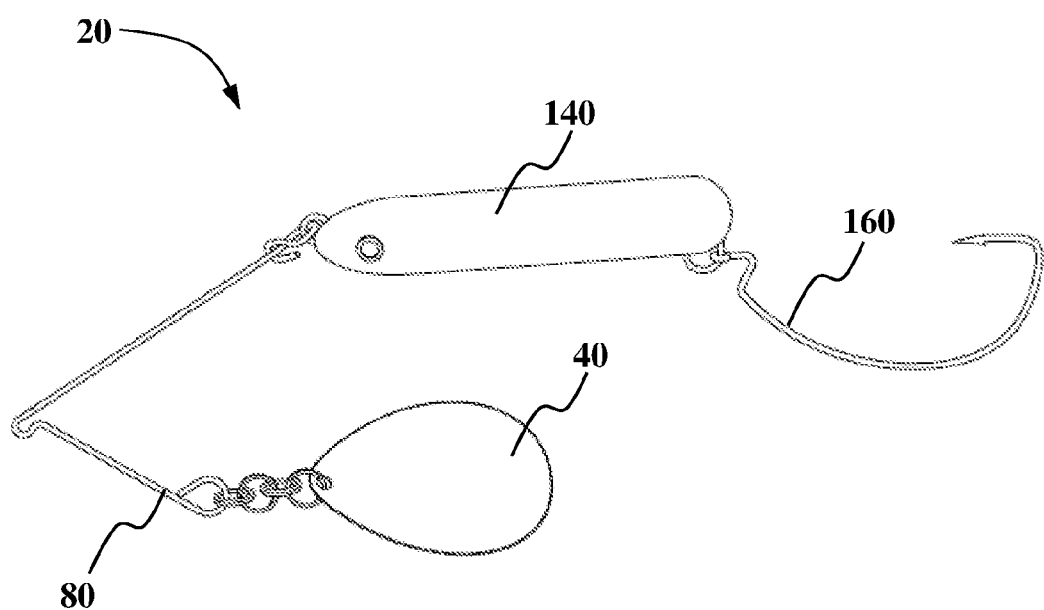
FIG. 18 is a diagrammatic perspective view of an eleventh preferred embodiment of a lure in accordance with the present invention.

Similarly, an improvement to existing lures can be achieved by simply adding the potential energy cycling means described herein. For example, a baited member in any preferred embodiment can be replaced with a common lure. With the weighted member defining the body, such an improved lure would then also comprise a rotating blade that rhythmically changes rotation direction and imparts periodic twitches into the lure body. This embodiment is shown in FIG. 18, which depicts a blade member 40, a wire form member 80, an existing lure body or weighted member 140, a hook 160, and a chain of link members coupling the blade member 40 to the wire form member 80.

Lastly, additional beads, clevises, rings, pins, spacers, weights, and other small lure-making components can also be used when constructing the novel lure.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A fishing lure, comprising:
   a wire form member;
   at least one blade member;
   at least one link member coupling said at least one blade member to said wire form member;
   wherein said at least one link member can rotate at least 360 degrees around an imaginary rotational axis relative to said wire form member, wherein said at least one link member prevents unlimited rotation of said at least one blade member relative to said wire form member;
   wherein said at least one blade member exhibits a movement defined by first rotation of generally more than 360 degrees in a first direction followed by a second rotation of generally more than 360 degrees in a generally opposite direction;
   wherein said lure remains in a generally upright orientation during said movement; and
   wherein said movement cyclically repeats itself as said lure is pulled forward in water.

2. A fishing lure in accordance with claim 1 further comprising at least one hook.

3. A fishing lure in accordance with any preceding claim further comprising at least one weighted member.

4. A fishing lure in accordance with any preceding claim further comprising at least one elastomeric body member having at least one anatomical feature of a small creature such as a small fish, amphibian, mammal, reptile, mollusk, crustacean, bird, or insect.

5. A fishing lure in accordance with any preceding claim further comprising at least one rattle element.

6. A fishing lure in accordance with any proceeding claim wherein said at least one link member is formed from an elastomeric material, plastic material, metallic material, or any combination thereof.

7. A fishing lure, comprising:
   a wire form member;
   a means for coupling a fishing line to said wire form member;
   at least one blade member;
   at least one non-swivel link member coupling said at least one blade member to said wire form member, said at least one non-swivel link member enabling more than 360 degrees of rotation of said at least one blade member relative to said wire form member, said at least one non-swivel link member preventing unlimited rotation of said at least one blade member relative to said wire form member;
   wherein said at least one blade member exhibits a repeating spinning movement in sequentially opposite rotational directions, each said spinning movement in each of said rotational directions generally measuring more than 360 rotational degrees; and
   wherein said at least one blade member and said wire form member are sized and dimensioned so as to prevent said lure from spinning more than 360 degrees relative to said fishing line as said lure is pulled forward at a generally constant speed.

8. A fishing lure in accordance with claim 7 further comprising at least one hook.

9. A fishing lure in accordance with claim 8 wherein said at least one hook is pivotally coupled to said wire form member.

10. A fishing lure in accordance with claim 7 further comprising at least one weighted member.

11. A fishing lure in accordance with claim 7 further comprising at least one rattle element.

12. A fishing lure in accordance with claim 7 wherein said wire form member comprises more than one leg.

13. A fishing lure, comprising:
    at least one link member, wherein said at least one link member further comprises a means for coupling a fishing line thereto;
    at least one blade member, wherein said at least one blade member is coupled to said at least one link member, wherein said at least one link member enables said at least one blade member to rotate more than 360 degrees relative to said fishing line, wherein said at least one link member prevents unlimited rotation of said at least one blade member relative to said fishing line;
    wherein said blade member exhibits a cyclically repeating change of rotation direction; and
    wherein said lure remains in a generally upright orientation when being pulled forward at a generally constant speed.

14. A fishing lure in accordance with claim 13 further comprising at least one wire form member.

15. A fishing lure in accordance with claim 14 wherein said at least one wire form member comprises more than one leg.

16. A fishing lure in accordance with claim 13 further comprising at least one weighted member.

17. A fishing lure in accordance with claim 13 further comprising at least one hook.

18. A fishing lure in accordance with claim 17 wherein said at least one hook is pivotally coupled to said at least one link member.

19. A fishing lure in accordance with claim 13 further comprising at least one rattle element.

20. A fishing lure in accordance with claim 13 wherein said at least one link member is formed from an elastomeric material, plastic material, metallic material, or any combination thereof.

* * * * *